(12) United States Patent
Turrie et al.

(10) Patent No.: US 9,756,097 B2
(45) Date of Patent: Sep. 5, 2017

(54) NON-DSG MECHANISMS FOR ALIGNING CLIENT DEVICES WITH THEIR MULTICAST DATA FLOWS IN A DOCSIS NETWORK ENVIRONMENT

(71) Applicant: Cisco Technology, Inc., San Jose, CA (US)

(72) Inventors: David Philip Turrie, Lawrenceville, GA (US); Timothy C. Richards, Cumming, GA (US)

(73) Assignee: Cisco Technology, Inc., San Jose, CA (US)

( * ) Notice: Subject to any disclaimer, the term of this patent is extended or adjusted under 35 U.S.C. 154(b) by 24 days.

(21) Appl. No.: 13/924,652

(22) Filed: Jun. 24, 2013

(65) Prior Publication Data
US 2014/0380384 A1    Dec. 25, 2014

(51) Int. Cl.
- *H04N 7/173* (2011.01)
- *H04L 29/06* (2006.01)
- *H04N 21/6405* (2011.01)
- *H04L 12/18* (2006.01)

(52) U.S. Cl.
CPC ........ *H04L 65/4076* (2013.01); *H04L 12/185* (2013.01); *H04N 21/6405* (2013.01)

(58) Field of Classification Search
None
See application file for complete search history.

(56) References Cited

U.S. PATENT DOCUMENTS

| | | | |
|---|---|---|---|
| 8,422,939 B2* | 4/2013 | Narasimhan et al. | 455/3.01 |
| 2005/0220064 A1* | 10/2005 | Hundscheidt et al. | 370/342 |
| 2007/0180072 A1* | 8/2007 | Siripunkaw et al. | 709/220 |
| 2010/0011094 A1* | 1/2010 | Ver Steeg et al. | 709/220 |
| 2014/0150017 A1* | 5/2014 | Chang | 725/34 |
| 2014/0169222 A1* | 6/2014 | Cohen et al. | 370/255 |
| 2014/0282775 A1* | 9/2014 | Bhat et al. | 725/109 |
| 2014/0289770 A1* | 9/2014 | Zhang et al. | 725/39 |
| 2014/0369352 A1* | 12/2014 | Zhou | 370/390 |

* cited by examiner

*Primary Examiner* — Brian Yenke
*Assistant Examiner* — Samira Monshi
(74) *Attorney, Agent, or Firm* — Merchant & Gould P.C.

(57) ABSTRACT

Video messaging may be provided. First, a bootstrap message including a system address may be transmitted by a high level device. A user device may receive the bootstrap message from the high level device and obtain system data from the system address contained in the received bootstrap message. The user device may then determine a service group in which the user device is deployed. Next, the user device may determine, from the obtained system data, a sub-system address corresponding to the determined service group. The user device may then obtain sub-system data from the sub-system address.

22 Claims, 5 Drawing Sheets

NON-DSG MECHANISMS FOR ALIGNING CLIENT DEVICES WITH THEIR MULTICAST DATA FLOWS IN A DOCSIS NETWORK ENVIRONMENT

TECHNICAL FIELD

The present disclosure relates generally to video related messages.

BACKGROUND

Data Over Cable Service Interface Specification (DOCSIS) is an international telecommunications standard that permits the addition of high-speed data transfer to an existing cable television (CATV) system. DOCSIS may be employed to provide Internet access over existing hybrid fiber-coaxial (HFC) infrastructure. DOCSIS Set-top Gateway (DSG) is a specification describing how out-of-band data is delivered to a cable set-top box. Cable set-top boxes need a reliable source of out-of-band (OOB) data for information such as program guides, channel lineups, and updated code images.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
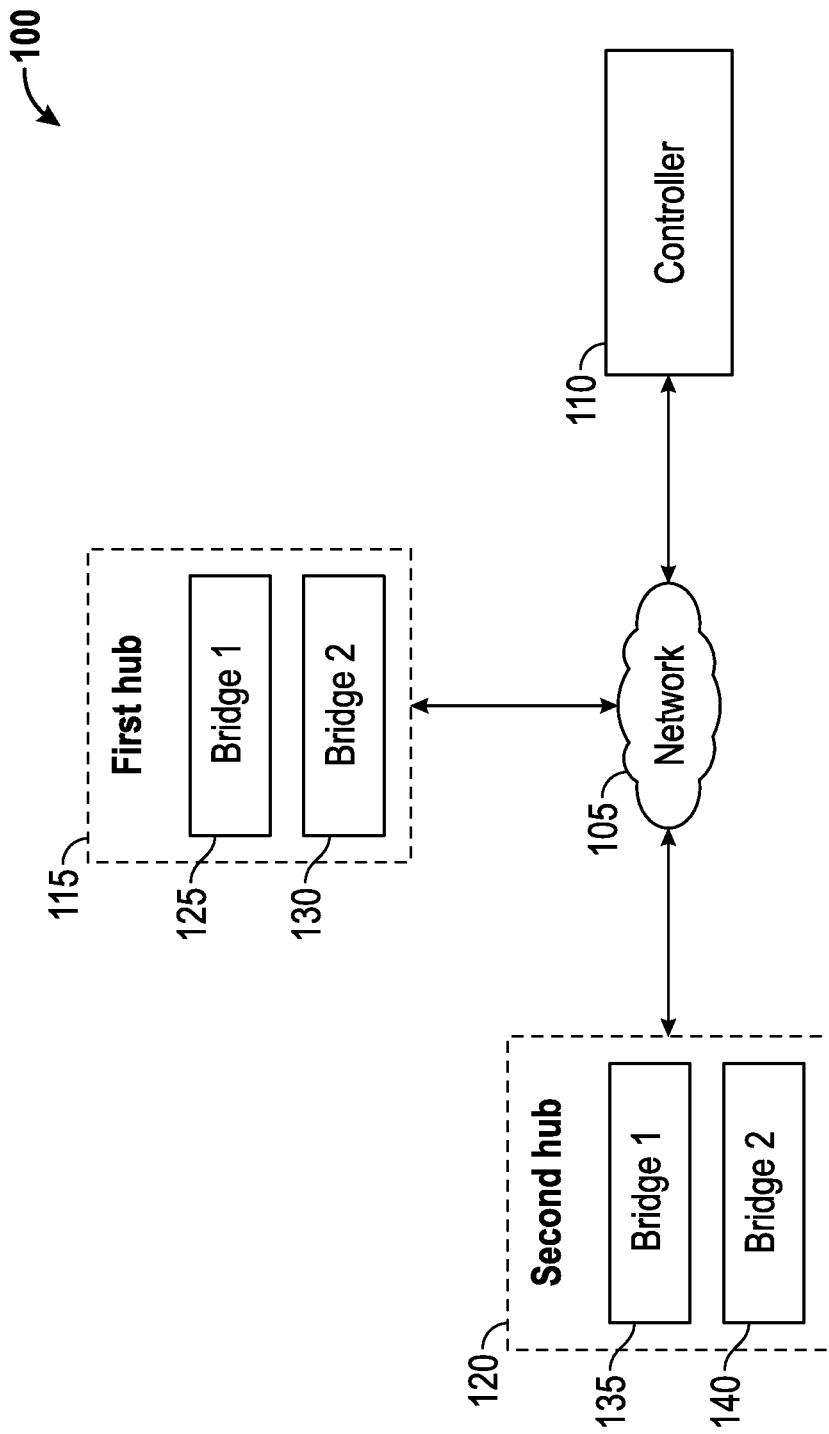
FIG. 1 is a block diagram of an operating environment for providing video related messages.

Video messaging may be provided. First, a bootstrap message including a system address may be transmitted by a high level device. A user device may receive the bootstrap message from the high level device and obtain system data from the system address contained in the received bootstrap message. The user device may then determine a service group in which the user device is deployed. Next, the user device may determine, from the obtained system data, a sub-system address corresponding to the determined service group. The user device may then obtain sub-system data from the sub-system address.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

User devices (e.g., set-top boxes (STBs)) may receive video related messages (e.g., command and/or control data) via OOB communications path sourced, for example, by DSG servers when operating in a DOCSIS network. Consistent with embodiments of the disclosure, multicast data flows may be used as a message delivery system for the video related messages. In order to use multicast data flows as the message delivery system, the user device population may need to be informed how to join a proper multicast data flow in order to receive appropriate video related messages targeted for a specific user device or group of user devices. This may be because user devices may be required to join specific multicast groups since DSG servers may transmit unique video related messages per the different multicast groups.

A channel map may be an example of a video related message that may be transmitted per the different multicast groups. A cable television plant may be modeled by a controller using a collection of logical constructs called "digital hubs". A user device located within a certain geographic area in a digital hub (e.g., hub A) may download a channel map that is different from a channel map downloaded by a user device located in a different geographic area in a different digital hub (e.g., hub B). Consequently, the user devices in hub A may need to join a specific multicast group (e.g., group 1), while the user devices in hub B may join a completely different multicast group (e.g., group 2). Embodiments of the disclosure may provide a process for directing a given user device to join a proper multicast group. For example, a service group size may be between 250-500 homes passed, while bridges and hubs may be in the tens to hundreds of thousands of homes passed.

FIG. 1 is a block diagram of an operating environment 100. As shown in FIG. 1, environment 100 may comprise a digital video network that may include a network 105, a controller 110, a first hub 115, and a second hub 120. First hub 115 may comprise a first hub first bridge 125 and a first hub second bridge 130. Second hub 120 may comprise a second hub first bridge 135 and a second hub second bridge 140. Network 105 may comprise any type of network (e.g., the Internet, a hybrid fiber-coaxial (HFC) network, a content delivery network (CDN), etc.). Controller 110 may comprise a Digital Network Control System (DNCS) or a DOCSIS Set-top Gateway (DSG) system that may deliver command and control data to user devices. Command and control data may comprise, but is not limited to, OOB data such as program guides, channel lineups, and updated code images.

First hub 115 and second hub 120 may respectively comprise logical entities provisioned on controller 110 that may segment operating environment 100 into a population of user devices that receive, for example, the same channel map lineup and tuning information for broadcast sessions. First hub first bridge 125, first hub second bridge 130, second hub first bridge 135, and a second hub second bridge 140 may each respectively comprise logical entities provisioned on controller 110 that may segment operating environment 100 into user devices that receive command and/or control data targeted to a particular user device or a population of user devices equal to or smaller than a hub (e.g., first hub 115 or second hub 120). As will be described in greater detail below, first hub first bridge 125, first hub second bridge 130, second hub first bridge 135, and a second hub second bridge 140 may each respectively comprise service groups that may further segment the user devices in operating environment 100 on an even more granular level. Any of the aforementioned user devices may comprise a Digital Home Communication Terminal (DHCT) that may comprise, but is not limited to, a set-top box (STB), a digital video recorder, a cable modem, a personal computer, a Wi-Fi access point, a cellular base station, a switch servicing multiple clients in a vicinity, a tablet device, a mobile device, a smart phone, a telephone, a remote control device, a network computer, a mainframe, a router, or other similar device.

Figure 2:
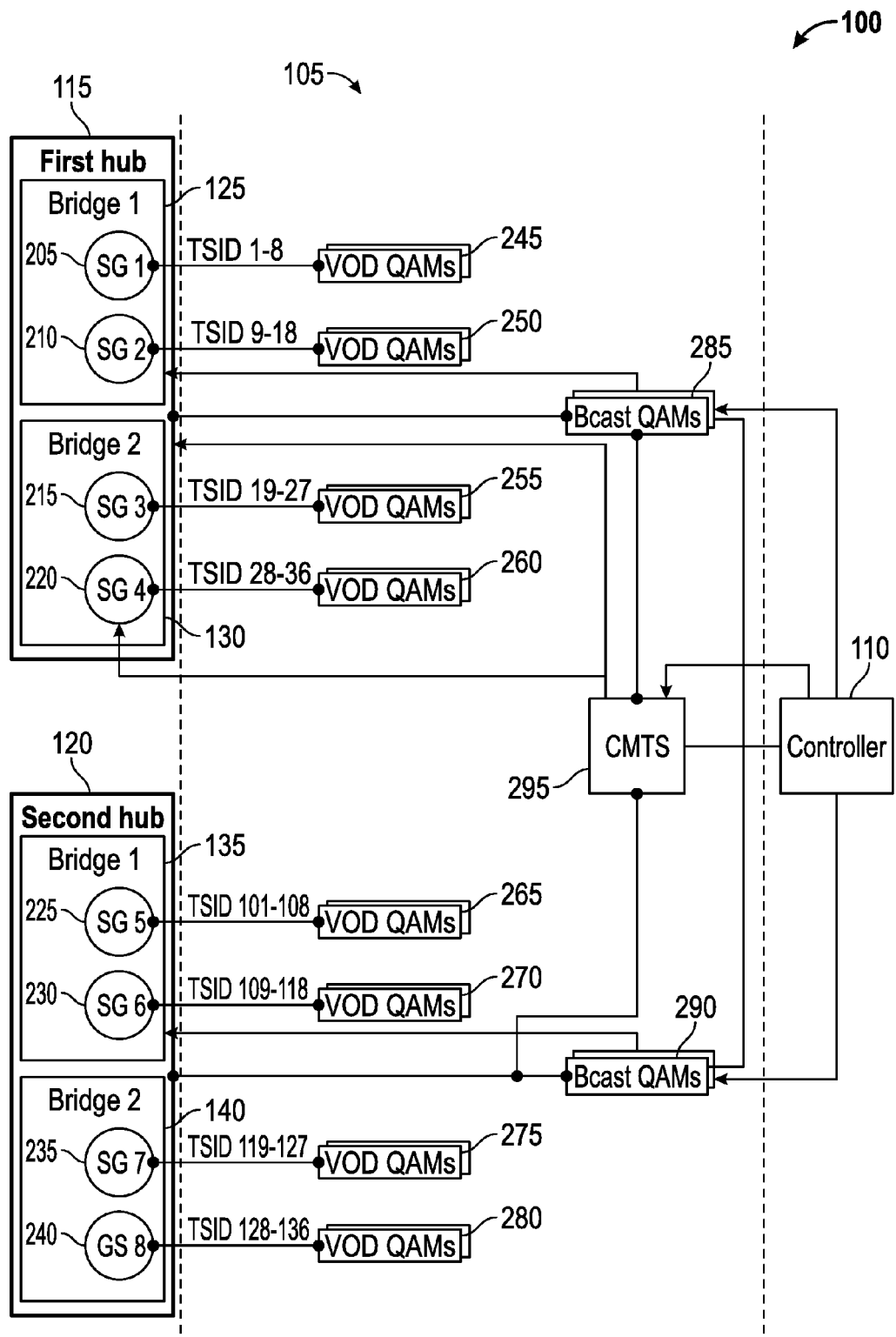
FIG. 2 is a block diagram of an operating environment for providing video related messages.

FIG. 2 is a block diagram of operating environment 100 in more detail consistent with an embodiment of the disclosure. As shown in FIG. 2, a plurality of service groups may be disposed in operating environment 100. A service group may comprise a logical entity provisioned on controller 110 that may segment the user device population (e.g., a plurality of user devices disposed in operating environment 100) into groups that share a same low level device. A low level device may comprise, but is not limited to, a quadrature amplitude modulation (QAM) device for video on-demand (VOD) content. A service group size may be, for example, between 250-500 homes passed.

Operating environment 100 may include a first service group 205 and a second service group 210 disposed in first hub first bridge 125. A third service group 215 and a fourth service group 220 may be disposed in first hub second bridge 130. Second hub first bridge 135 may include a fifth service group 225 and a sixth service group 230. And second hub second bridge 140 may include a seventh service group 235 and an eighth service group 240.

A plurality of low level devices may be included in operating environment 100. For example, operating environment 100 may include a first low level device 245, a second low level device 250, a third low level device 255, a fourth low level device 260, a fifth low level device 265, a sixth low level device 270, a seventh low level device 275, an eighth low level device 280. As stated above, any one or more of the plurality low level devices may comprise, but is not limited to, a QAM device for providing VOD content.

Figure 3:
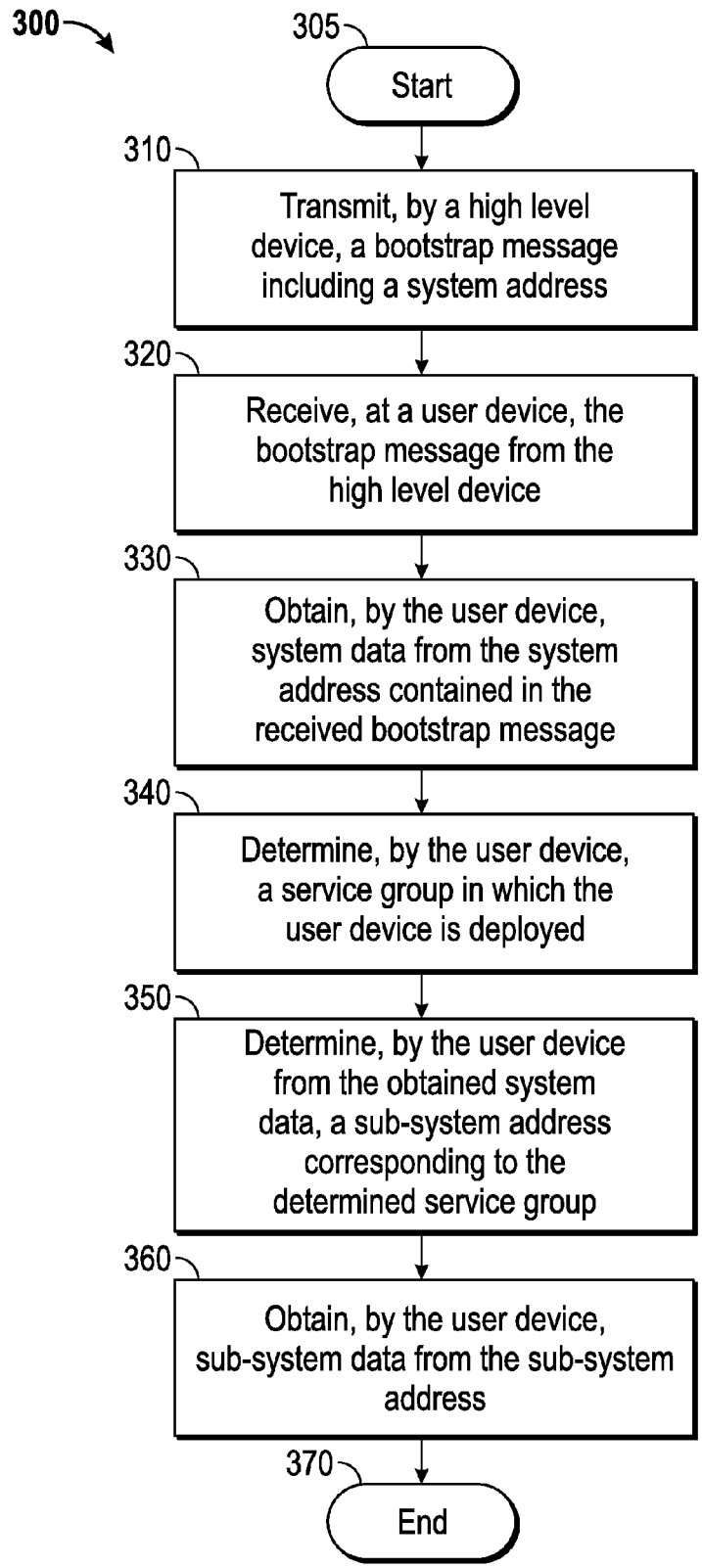
FIG. 3 is a flow chart of a method for providing video related messages.

A plurality of high level devices may also be included in operating environment 100. For example, operating environment 100 may include a first high level device 285 and a second high level device 290. Any one or more of the plurality high level devices may comprise, but is not limited to, a QAM device for providing broadcast content. Furthermore, operating environment 100 may include a Cable Modem Termination System (CMTS) 295 to provide high speed data services, such as cable Internet or voice over Internet Protocol, to the population of user devices. Although much of the command and control data, like channel maps, may be aligned along HUB or service group boundaries, a given CMTS 295 may not be aligned along HUB (e.g., first hub 115, second hub 120) or service group (e.g., service group one 205, service group two 210) boundaries within an operating environment 100. This leads to many of the data distribution issues that this embodiment seeks to address FIG. 3 is a flow chart setting forth the general stages involved in a method 300 consistent with an embodiment of the disclosure for providing video related messages. Method 300 may be implemented using first high level device 285, second high level device 290, and/or any of the plurality of user devices disposed in operating environment 100, any of which may be embodied in a computing device 500 as described in more detail below with respect to FIG. 5. Ways to implement the stages of method 300 will be described in greater detail below. As will be described below, method 300 may allow user devices to obtain their respective multicast flows for control data while maintaining service group level granularity for OOB bridge definitions.

Method 300 may begin at starting block 305 and proceed to stage 310 where high level device 285 may transmit a bootstrap message including a system address. For example, controller 110 may send the plurality of high level devices (e.g., first high level device 285 and high level device 290) the system address. The system address may comprise a location where a multicast flow may be joined to obtain system data. First high level device 285 may continuously insert the bootstrap message into its outputs. The system data may comprise, but is not limited to: i) a first file that correlates transport stream identifiers to service group identifiers; ii) a second file that correlates service group identifiers to bridge identifiers; and iii) a third file that correlates bridge identifiers to sub-system addresses. The sub-system addresses in the third file may correspond to respective multicast flows designated for a service group or service groups contained in corresponding bridges.

From stage 310, where high level device 285 transmits the bootstrap message, method 300 may advance to stage 320 where a user device (e.g., disposed in first service group 205) may receive the bootstrap message from high level device 285. For example, the user device may scan its corresponding QAM spectrum that may be transmitted by first high level device 285. Within the transmitted QAM spectrum, the user device may obtain the bootstrap message.

Once the user device receives the bootstrap message in stage 320, method 300 may continue to stage 330 where the user device may obtain system data from the system address contained in the received bootstrap message. For example, the user device may parse the received bootstrap message for the system address. Then the user device may join a system multicast flow corresponding to the system address. The system multicast flow may be transmitted from controller 110. From the system multicast flow, the user device may obtain the system data. As stated above, the system data may comprise, but is not limited to: i) a first file that correlates transport stream identifiers to service group identifiers; ii) a second file that correlates service group identifiers to bridge identifiers; and iii) a third file that correlates bridge identifiers to sub-system addresses.

After the user device obtains the system data in stage 330, method 300 may proceed to stage 340 where the user device may determine a service group in which the user device is deployed. For example, the user device may be provisioned on first low level device 245. The user device may query first low level device 245 for a transport stream identifier corresponding to the user device. Then the user device may use the first file to look up a service group ID that correspond to the transport stream identifier obtained from first low level device 245.

From stage 340, where the user device determines the service group, method 300 may advance to stage 350 where the user device may determine, from the obtained system data, a sub-system address corresponding to the determined service group. For example, the user device may query the second file (e.g., that may correlate service group identifiers to bridge identifiers) with the service group ID obtained from the first file. In other words, the user device may use the second file to look up a bridge ID that corresponds to the service group ID obtained from the first file. With the obtained bridge ID, the user device may then use the third file to look up a sub-system address that corresponds to the bridge ID obtained from the second file. The sub-system addresses obtained from the third file may correspond to a respective multicast flow designated for the bridge in which the user device's service group is provisioned.

Once the user device determines the sub-system address in stage 350, method 300 may continue to stage 360 where the user device may obtain, sub-system data from the sub-system address. For example, the user device may join the multicast flow at the sub-system address (e.g., the multicast flow designated for the bridge in which the user device's service group is provisioned). The multicast flow at the sub-system address may be transmitted from controller 110 and may provide the sub-system data. The sub-system data may comprise control data. The control data may comprise, but is not limited to, a program guide for the area in which the user device is located, a channel line-up for the area in which the user device is located, or an updated code image for the user device. Once the user device obtains the sub-system data in stage 360, method 300 may then end at stage 370.

Figure 4:
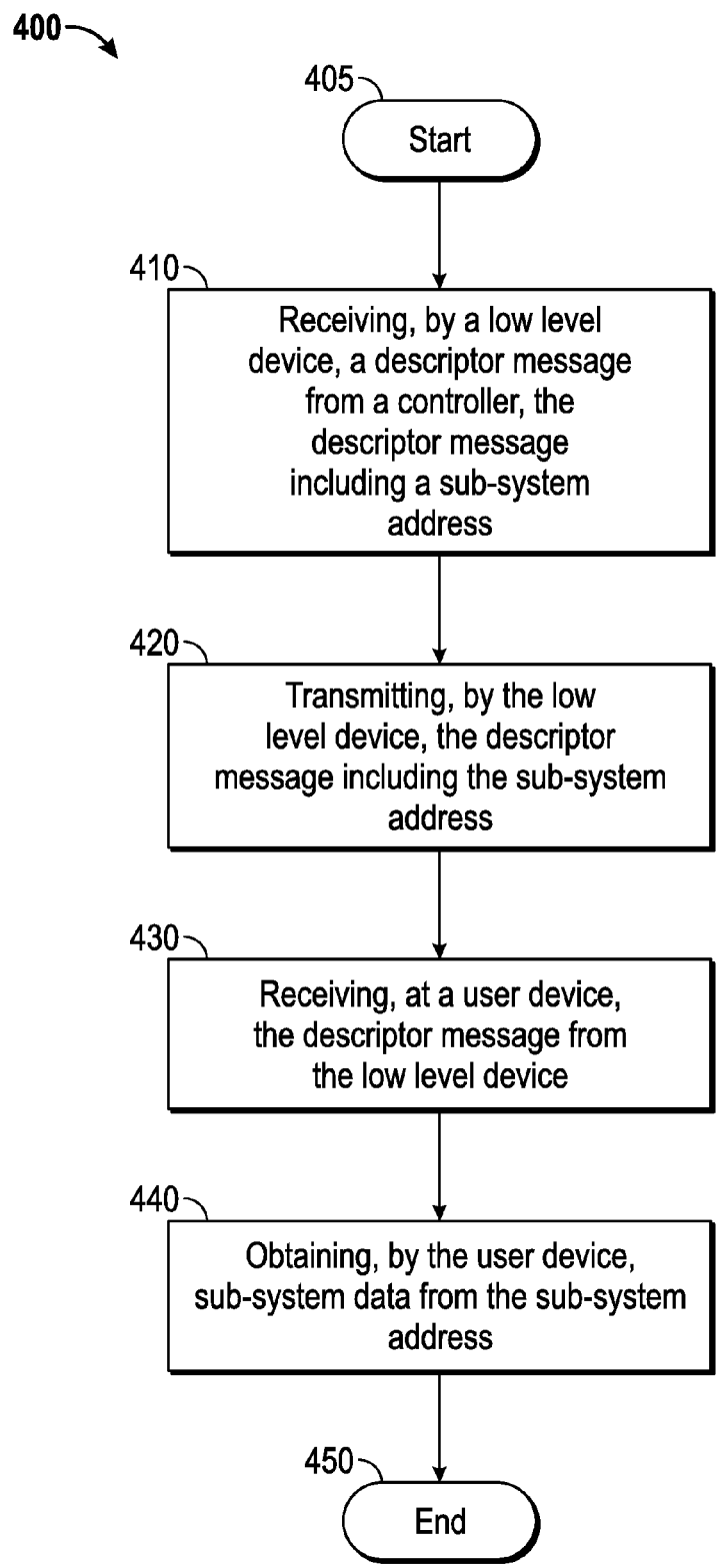
FIG. 4 is a flow chart of a method for providing video related messages.

FIG. 4 is a flow chart setting forth the general stages involved in a method 400 consistent with an embodiment of the disclosure for providing video related messages. Method 400 may be implemented using an of the plurality of low level devices and/or any of the plurality of user devices, any of which may be embodied in computing device 500 as described in more detail below with respect to FIG. 5. Ways to implement the stages of method 400 will be described in greater detail below. As will be described below, method 400 may allow user devices to obtain their respective multicast flows for control data while maintaining service group level granularity for OOB bridge definitions. In method 400, controller 110 may create a descriptor message (e.g., a multicast descriptor message (MDM)) that may list all the OOB multicast flows associated for a given bridge, but the plurality of low level devices (e.g., VOD QAMs) may be responsible for inserting the descriptor message on their output ports.

Method 400 may begin at starting block 405 and proceed to stage 410 where low level device 245 may receive a descriptor message from controller 110. The descriptor message may include a sub-system address. For example, controller 110 may be aware of which service groups are provisioned on which low level devices. Controller 110, for example, may know that first service group 205 may be provisioned on first low level device 245. Consequently, controller 110 may send, to first low level device 245, the descriptor message that includes a sub-system address specific to first service group 205. In other words, knowing that first service group 205 may be provisioned on first low level device 245, controller 110 may send the sub-system address corresponding to a multicast flow where first service group 205 can obtain subsystem data (e.g., control data) designated for first service group 205.

From stage 410, where low level device 245 receives the descriptor message, method 400 may advance to stage 420 where low level device 245 may transmit the descriptor message including the sub-system address. For example, first low level device 245 may continuously insert the descriptor message into its outputs. The descriptor message may comprise, but is not limited to, the sub-system address corresponding to a multicast flow where first service group 205, for example, can obtain subsystem data (e.g., control data) designated for first service group 205.

Once low level device 245 transmits the descriptor message in stage 420, method 400 may continue to stage 430 where a user device (e.g., disposed in first service group 205) may receive the descriptor message from low level device 245. For example, the user device may scan its corresponding QAM spectrum that may be transmitted by first low level device 245. Within the transmitted QAM spectrum, the user device may obtain the descriptor message.

After the user device receives the descriptor message in stage 430, method 400 may proceed to stage 440 where the user device may obtain sub-system data from the sub-system address. For example, the user device may join the multicast flow at the sub-system address (e.g., the multicast flow designated for the bridge in which the user device's service group is provisioned). The multicast flow at the sub-system address may be transmitted from controller 110 and may provide the sub-system data. The sub-system data may comprise control data. The control data may comprise, but is not limited to, a program guide for the area in which the user device is located, a channel line-up for the area in which the user device is located, or an updated code image for the user device. Once the user device obtains the sub-system data in stage 440, method 400 may then end at stage 450.

Figure 5:
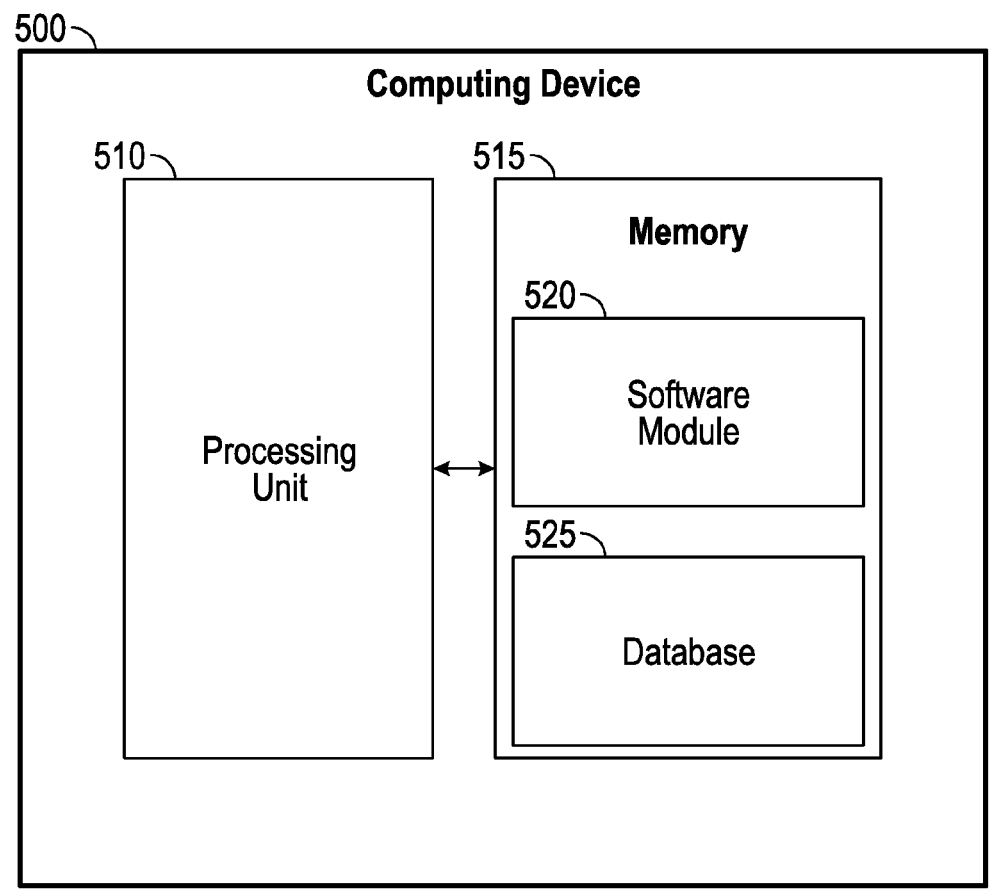
FIG. 5 is a block diagram of a computing device.

FIG. 5 shows a computing device 500. As shown in FIG. 5, computing device 500 may include a processing unit 510 and a memory unit 515. Memory unit 515 may include a software module 520 and a database 525. While executing on processing unit 510, software module 520 may perform processes for providing video related messages, including for example, any one or more of the stages from method 300 or method 500 described above with respect to FIG. 3 and FIG. 5. Computing device 500, for example, may provide an operating environment for any of the plurality of user devices, any of the plurality of low level devices, any of the plurality of high level devices, controller 110, or CMTS 295. Any of the plurality of user devices, any of the plurality of low level devices, any of the plurality of high level devices, controller 110, or CMTS 295 may operate in other environments and are not limited to computing device 500.

Computing device 500 ("the processor") may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

An embodiment consistent with the disclosure may comprise a system for providing video related messages. The system may comprise a memory storage and a processing unit coupled to the memory storage. The processing unit may be operative to receive a bootstrap message from a high level device and obtain system data from a system address contained in the received bootstrap message. In addition, the processing unit may be operative to determine a service group in which the user device is deployed and to determine, from the obtained system data, a sub-system address corresponding to the determined service group. Moreover, the processing unit may be operative to obtain sub-system data from the sub-system address.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving, at a first user device and a second user device different from the first user device, a bootstrap message from a high level device comprising a device for providing broadcast content;

obtaining, by the first user device and the second user device, system data from a system address contained in the received bootstrap message, wherein obtaining the system data comprises parsing the received bootstrap message to obtain the system data comprising a first file that correlates transport stream identifiers to service group identifiers, a second file that correlates service group identifiers to bridge identifiers, and a third file that correlates bridge identifiers to sub-system addresses;

determining, by the first user device, from the obtained system data, a first service group in which the first user device is deployed, wherein determining the first service group comprises querying the first file for a transport stream identifier associated with the first user device to determine the first service group and receiving, in response to the query to the first file, the first service group in which the first user device is deployed;

determining, by the first user device from the obtained system data, a first sub-system address corresponding to the determined first service group, wherein determining the first sub-system address comprises:

querying the second file with a service group identifier (ID) obtained from the first file for the determined first service group, receiving, in response to the query, a first bridge ID corresponding to the service group ID, querying the third file with the first bridge ID obtained from the second file, and receiving, in response to querying the third file, the first sub-system address corresponding to the first bridge ID;

obtaining, by the first user device, first sub-system data from the first sub-system address, the first sub-system data being specific to a geographic area in which the first user device is located;

determining, by the second user device, from the obtained system data, a second service group in which the user second user device is deployed; and determining, by the second user device from the obtained system data, a second sub-system address corresponding to the determined second service group, the second sub-system address being different from the first sub-system address.

2. The method of claim 1, wherein receiving the bootstrap message comprises receiving the bootstrap message in response to the first user device scanning a Quadrature Amplitude Modulation (QAM) spectrum of the high level device for the bootstrap message.

3. The method of claim 1, wherein receiving the bootstrap message comprises receiving the bootstrap message at the first user device comprising a set-top box.

4. The method of claim 1, wherein obtaining the system data comprises the first user device joining a multicast group.

5. The method of claim 1, wherein obtaining the system data comprises obtaining the system data from a controller.

6. The method of claim 1, wherein obtaining the system data comprises obtaining the system data from a controller comprising a Digital Network Control System (DNCS).

7. The method of claim 1, wherein obtaining the system data comprises obtaining the system data comprising a file correlating service group IDs to bridge IDs.

8. The method of claim 1, wherein determining the first service group comprises determining the first service group comprising a logical entity that segments a population of user devices into groups that share a same low level device.

9. The method of claim 1, wherein determining the first service group comprises determining the first service group comprising a logical entity that segments a population of user devices into groups that share a same low level device comprising a video on-demand (VOD) QAM device.

10. The method of claim 1, wherein determining the first sub-system address corresponding to the determined first service group comprises determining the first sub-system address comprising a multicast group from which the first sub-system data is obtained.

11. The method of claim 1, wherein obtaining the first sub-system data comprises obtaining the first sub-system data comprising command data.

12. The method of claim 1, wherein obtaining the first sub-system data comprises obtaining the first sub-system data comprising command data comprising at least one of the following: a program guide specific to the geographic area in which the first user device is located; a channel line-up specific to the geographic area in which the first user device is located; and an updated code image specific to the geographic area in which the first user device is located.

13. The method of claim 1, further comprising transmitting, by the high level device, the bootstrap message including the system address.

14. The method of claim 13, wherein transmitting comprises continuously inserting the bootstrap message into at least one output of the high level device.

15. The method of claim 13, wherein transmitting, by the high level device, comprises transmitting, by the high level device comprising a broadcast (QAM) device.

16. The method of claim 1, further comprising:
joining a first multicast flow at the first sub-system address; and receiving sub-system data from the first multicast flow, the sub-system data comprising at least one of the following: a program guide for the geographic area, a channel lineup for the geographic area, and an updated code image specific to the geographic area in which the first user device is located.

17. An apparatus comprising:
a memory storage; and
a processing unit coupled to the memory storage, wherein the processing unit is operative to:
receive a bootstrap message from a high level device comprising a device for providing broadcast content;
obtain system data from a system address contained in the received bootstrap message, the system data comprising a first file that correlates transport stream identifiers to service group identifiers, a second file that correlates service group identifiers to bridge identifiers, and a third file that correlates bridge identifiers to sub-system addresses;
determine, from the obtained system data, a first service group in which a first user device is deployed, wherein the processing unit being operative to determine the first service group comprises the processing unit further operative to query the first file for a transport stream identifier associated with the first user device to determine the first service group and receive, in response to the query to the first file, the first service group which the apparatus is deployed;
determine, from the obtained system data, a first sub-system address corresponding to the determined service group, wherein the processing unit being operative to determine the first sub-system address comprises the processing unit being further operative to:
query the second file with a service group identifier (ID) obtained from the first file for the first service group,
receive, in response to the query, a first bridge ID corresponding to the first service group ID,
query the third file with the first bridge ID obtained from the second file, and
receive, in response to querying the third file, the first sub-system address corresponding to the first bridge ID;
obtain sub-system data from the first sub-system address, the subsystem data being specific to a geographic area in which the first user device is located;
determine from the obtained system data, a second service group in which a user second user device is deployed; and
determine, from the obtained system data, a second sub-system address corresponding to the second service group, the second sub-system address being different from the first sub-system address.

18. The apparatus of claim 17, wherein the processing unit being operative to receive the bootstrap message comprises the processing unit being operative to scan a quadrature amplitude modulation (QAM) spectrum of a high level device for the bootstrap message.

19. The apparatus of claim 17, wherein the processing unit being operative to obtain the system data comprises the processing unit being operative to join a multicast group.

20. The apparatus of claim 17, wherein the processing unit being operative to obtain the sub-system data comprises the processing unit being operative to obtain the sub-system data comprising command data.

21. The apparatus of claim 17, wherein the processing unit being operative to obtain the sub-system data comprises the processing unit being operative to obtain the sub-system data comprising command data comprising at least one of the following: a program guide specific to the geographic area in which the first user device is located; a channel line-up specific to the geographic area in which the first user device is located; and an updated code image specific to the geographic area in which the first user device is located.

22. The apparatus of claim 17, wherein the first sub-system address corresponds to a respective multicast flow designated for a first bridge in which the service group for the first user device is provisioned.

\* \* \* \* \*